(12) United States Patent
Hanes et al.

(10) Patent No.: US 6,651,184 B1
(45) Date of Patent: Nov. 18, 2003

(54) ISOCHRONOUS TRANSFER MODE ON A UNIVERSAL SERIAL BUS WITH ERROR CORRECTION ALGORITHMS

(75) Inventors: David H Hanes, Loveland, CO (US); Lawrence N Taugher, Loveland, CO (US); Stephen F Bayless, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/433,778

(22) Filed: Nov. 3, 1999

(51) Int. Cl.[7] .............................................. G06F 13/00

(52) U.S. Cl. ............................................ 714/5; 714/44

(58) Field of Search ....................... 714/5, 44

(56) References Cited

U.S. PATENT DOCUMENTS

| | | | | |
|---|---|---|---|---|
| 5,768,502 A | * | 6/1998 | Ikushima et al. ............... | 714/5 |
| 5,968,147 A | * | 10/1999 | Polfer et al. .................. | 710/52 |
| 5,968,197 A | * | 10/1999 | Doiron ........................ | 714/748 |
| 6,141,221 A | * | 10/2000 | Tong et al. .................. | 361/724 |
| 6,307,974 B1 | * | 10/2001 | Tsujimoto .................... | 370/352 |
| 6,311,294 B1 | * | 10/2001 | Larky et al. .................. | 710/33 |

OTHER PUBLICATIONS

Universal Serial Bus Specification, Sep. 23, 1998, Revision 1.1, Chapters 4, 5, and 8.*
Langhammer et al., "Reed–Solomon Codec Design in Programmable Logic," Dec. 1998, CommsDesign, pp. 1–14.*
"Reed–Solomon Codec Design in Programmable Logic," CMP, CommsDesign, Embedded Systems Conference, pp. 1 through 14; http://www.commsdesign.com/main/9812/9812feet3.htm, Jul. 31, 2003/
"Reed–Solomon error correction," From Wikipedia, the free encyclopedia, pp. 1–2; http://www.wikipedia.org/wiki/Reed–Solomon_error_correction, Jul. 29, 2003.

* cited by examiner

*Primary Examiner*—Scott Baderman
*Assistant Examiner*—Michael Maskulinski

(57) ABSTRACT

The present invention relates to the attachment of latency-intolerant devices, such as CD-RW devices to a well supported high bandwidth interface on a host computer. A preferred high bandwidth interface is the Universal Serial Bus (USB) which is commonly installed in personal computers manufactured in the late 1990's. A need for both high pre-allocated bandwidth makes use of the Isochronous transfer mode desirable for communication with CD-RW and other devices requiring continuous data transmission. One of a range of data reliability mechanisms is preferably implemented on the connection to the USB to ensure accuracy in data transmission to the various devices connected to the USB.

16 Claims, 2 Drawing Sheets

ISOCHRONOUS TRANSFER MODE ON A UNIVERSAL SERIAL BUS WITH ERROR CORRECTION ALGORITHMS

BACKGROUND

Computer systems, particularly personal computer systems (PCs), use peripheral devices for data storage and retrieval and communications among other tasks. Peripheral devices include hard drives, floppy drives, Compact disk (CD) devices which include Compact Disk Recordable (CD-R) drives and Compact Disk Re-Writeable (CD-RW) drives, tape drives, modems, keyboards, pointing devices (mouse), and scanners. Peripheral devices may be mounted internally, that is, inside the computer case, or mounted external to the computer case. Peripheral devices are connected to, and communicate with, the computer through an interface, such as an Integrated Drive Electronic (IDE), Enhanced Integrated Drive Electronic (EIDE), AT Attachment Packet Interface (ATAPI), Small Computer System Interface (SCSI), or Peripheral Component Interconnect (PCI) interfaces.

User installed peripheral devices that are internally mounted are generally not desirable. Users typically lack the necessary skills for such installation and configuration. Installation involves opening a computer case, securing the device to the case, connecting power lines to the power supply, connecting data lines to the motherboard, installing a controller card on the motherboard, and configuring jumper blocks on the device (such as master/slave on IDE, SCSI ID's for SCSI). After installation, the user must then configure the device for operation in the system. This may involve resetting parameters in the Basic Input Output System (BIOS) and/or configuring files in the operating system (OS). Although the plug and play mechanism has simplified the configuration aspects somewhat, installation is still beyond most users.

One solution to this problem is to have peripheral devices externally coupled to preconfigured and pre-installed ports, such as serial ports or parallel ports. These types of ports are standard on most computers. The user would merely connect a cable from the device to the appropriate port on the computer case, and connect a power supply cable to a wall socket. A problem which may arise, however, is that serial ports are generally slow. Further, some serial port controllers lack data buffering, which may cause data to be lost when higher communication speeds are employed. Moreover, external peripheral devices are also frequently used with portable computers, such as laptops, which have few, if any, internal device bays. Problems may also arise when using the parallel port. The parallel port is not a system bus, but rather is a connecter to a card that is connected to the system bus. The parallel port is designed to send and receive several data bits simultaneously on multiple wires. The card which is connected to the system bus, with a parallel chip set, converts the parallel data into system bus data, and vice versa. Generally, different parallel chip sets are used among different computer systems. Consequently, many incompatibilities may arise when external devices employing a single communication standard are used with different parallel port chip sets, possibly employing different and incompatible standards. Moreover, the parallel port may operate in a variety of modes, such as bi-directional, ECP (Extended Capability Port), SPP (standard printer port), and EPP (enhanced parallel port) modes. In some computers, certain modes are too slow to support high data rate devices such as a CD-RW, and thus the device cannot operate in that mode. To ensure proper operation, a user would have to alter the parallel port settings in the BIOS.

Another solution is to add an interface card to the system, such as a SCSI card. This would allow a user to plug the external device into the card. However, this solution requires installation of the card, typically into an ISA or PCI expansion slot on motherboard, which is internal to the computer case as described above. Installation of an interface card also generally incurs the difficulties associated with user configuration of devices installed internally to the computer system.

Yet another approach involves using the universal serial bus or USB. This bus features an external connection point, and thus would allow for a simple hook up of the external device. The USB is featured on most computers built after 1997. The USB operates with Windows 98 and Windows 2000, and thus has support in those operating systems. However, use of the USB presents problems for certain applications. One problem is that the USB is a shared bus enabling multiple devices to be plugged into the same bus at the same time, and thus all sharing the finite total bandwidth of the bus. The bandwidth availability for any one of the multiple devices may therefore be limited.

A further problem is presented by the available modes of data transfer on the USB. Currently, there are generally two communication modes for transferring data, a bulk mode and an isochronous transfer mode. The bulk mode provides error correction thereby generally ensuring that if erroneous data is included within a data packet, the packet will generally be resent until it is delivered in proper form. While such error correction and retransmission helps ensure accurate data transmission, the processes of correction and retransmission may substantially slow down the communication rate for bulk mode communication. Further, while isochronous data transmission is transmitted first and provided with pre-allocated bandwidth on the USB, bulk mode is generally assigned a low priority for transmission and is thereby not provided with a guaranteed bandwidth. Bulk data is generally transmitted only after higher priority data has been transmitted first.

Thus, while the integrity of bulk data can be ensured, data transfer is frequently interrupted by higher priority data. Therefore, this mode is not suited for use with devices that require a continuous flow of data such as CD-R or CD-RW devices. Note that when writing to a CD-RW device or other "continuous flow" data receiving devices such as a CD-R, or digital audio tape device, the data flow should preferably be uninterrupted. If there is a break in a bulk data transmission which is later resumed, the CD-RW, or other data receiving device, may not be able to seamlessly resume operation where a prior transmission ended. In an application such as writing to a CD-R disc, this may cause a CD "burn" to fail.

These problems originate with the design of the USB. The USB is designed for HID (Human Interface Device) devices, e.g. keyboards, mice, joysticks, etc. These devices have low data rate speeds and generally do not receive continuous streams of data. Consequently, there is generally little native support in computer operating systems for high speed, constant flow devices such as CD or CD-RW drives.

Therefore, there is a need in the art for an external interface for a computer that has a high data rate and which is compatible with the operating system in use.

SUMMARY OF THE INVENTION

These and other objects, features and technical advantages are achieved by a system and method which includes enabling an external device to be connected to an interface on a host computer which is well supported by the native operating system of the host computer and has a high, guaranteed communication bandwidth, and incorporating error correction information directly into a data stream between the host computer and the device as such data is sent. Introduction of the error correction information into the data stream may be accomplished employing hardware, firmware, software, or a combination of two or more of the three approaches. Such error correction information may be introduced by either the host computer or the external device. A data reliability mechanism may implement data retransmission according to established protocols such as TCP, Kermit, or Zmodem, or may implement error correction according to the Reed-Solomon algorithm. The listed data retransmission and error correction code protocols are well known in the art and will therefore not be discussed in detail herein.

In a preferred embodiment, the Universal Serial Bus (USB) on a host computer is employed for communication with the external device. The USB is generally well supported on personal computers and generally has a high communication bandwidth. Preferably, the Isochronous Transfer Mode is employed for data transmission between the USB and the external device, thereby enabling a high pre-allocated bandwidth to be reserved for the external device whose data reception demands are latency-intolerant.

Herein, data used for error correction purposes is referred to as "error correction data" or "error correction code," and data intended for delivery to, and use by, the external device is referred to as "device data" or "real data". A general term for a mechanism for ensuring accurate data delivery is "data reliability mechanism". Preferably, the data reliability mechanism employs error correction data to determine whether data in a packet or other data container is faulty. Upon determination that faulty data is present, the data reliability mechanism may either correct the data at the device which received the faulty data, without retransmission, or request a retransmission of the data from the transmitting device. Correction of data at a receiving device (as opposed to retransmission of the packet concerned) is referred to herein as "on-site" data correction. Preferably, both the host computer and the various possible external devices may be transmitters and recipients of data, and both may implement data reliability mechanisms. Herein, a "latency-intolerant" operation or device refers to a condition wherein a delay in data transmission substantially impairs a process or the operation of a device and where such impairment is not necessarily cured by supplying the required data at a later time.

In a preferred embodiment, error correction data is preferably introduced into the data stream as the data leaves the host computer for the connected external device. The error correction data may also be introduced into a data stream as such a data stream leaves the external device bound for the host computer. Preferably, both the host computer and external device have the ability to process the error correction data received along with the device data to determine whether a transmitted data packet contains corrupted data. Depending upon the nature of the error correction scheme or data reliability mechanism employed, a response to a determination that transmitted data contains errors may include having the receiving device (whether host computer or external device) request that the data packet containing the erroneous data be retransmitted. Alternatively, the data receiving device may correct the erroneous data upon receiving the data where the error correction scheme provides sufficient information for such correction.

It is an advantage of the present invention that an external interface is provided which has a high data rate and is well supported by the operating system native to a host computer.

It is a further advantage of the present invention that sufficient bandwidth may be pre-allocated for communication with an external device employing the high data rate external interface.

It is a still further advantage of the present invention that error correction may be implemented for high data rate communication on the external interface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
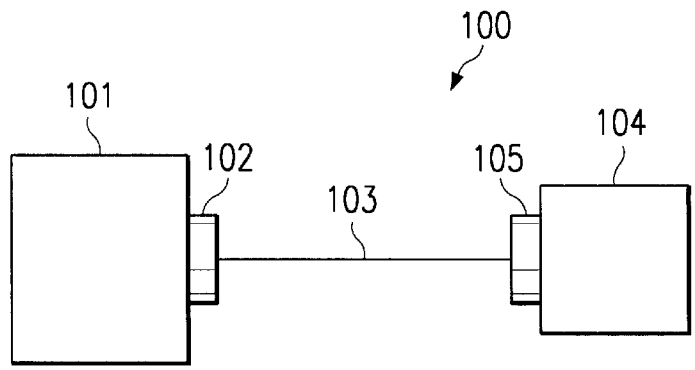
FIG. 1 depicts a host computer connected to an external device according to a preferred embodiment of the present invention.

FIG. 1 depicts a host computer 101 connected to external device 104 according to a preferred embodiment of the present invention. In a preferred embodiment, host computer 101, is connected to external device 104 employing link 103, which link is connected to computer port 102 and external device port 105.

In a preferred embodiment, the host computer is a personal computer running the Windows™ operating system. Alternatively, the host computer could be an Apple iMac™ computer, or other brand of personal computer running under a suitable operating system, and all such variations are within the scope of the invention. Port 102 on the host computer is preferably connected to a Universal Serial Bus or USB. The USB is selected because it preferably has a high level of software support on the operating system native to the host computer, thereby preferably minimizing the need for specialized software for implementing a connection to external device 104. After data is transmitted out of port 102 on the host computer 101, the data is preferably communicated along link 103 to port 105 on external device 104.

In a preferred embodiment, external device 104 preferably has latency-intolerant data transmission requirements.

Otherwise stated, device 104 preferably performs operations for which a delay in transmission of data to device 104 may cause an ongoing operation to be aborted, rather than merely delayed. An example of such a latency-intolerant device is a Compact Disc Re-Writeable (CD-RW) device which generally depends upon uninterrupted data transmission at a consistent data transmission rate or bandwidth. Where data transmission is interrupted to a CD-RW device which is writing to, or "burning" a CD, the burn may fail, requiring that the process start anew.

Other types of external devices may be used in connection with the present invention. However, devices performing latency-intolerant operations benefit more from the present invention than those performing latency-tolerant operations.

Figure 2:
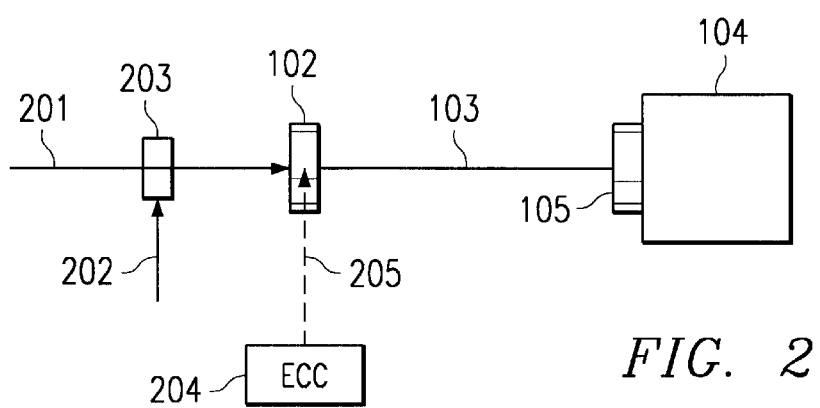
FIG. 2 depicts alternative transfer modes available for communication between a host computer and an external device according to a preferred embodiment of the present invention.

FIG. 2 depicts alternative transfer modes available for communication between a host computer and an external device according to a preferred embodiment of the present invention. A data stream being transmitted employing the isochronous transfer mode is depicted by element 201. A data stream being transmitted by the bulk transfer mode is depicted by element 202. A communication controller for arbitrating between the two transfer modes is depicted by element 203.

Generally, the isochronous transfer mode has the benefit of a high pre-allocated bandwidth, thereby ensuring that data communicated employing the isochronous transfer mode may be reliably delivered at a pre-determined rate. A drawback of the isochronous transfer mode is that it generally does not have a built-in data reliability mechanism whether in the form of data retransmission or error correction at a receiving device. The bulk transfer mode, whose data transmission is depicted by element 202, generally has built-in error detection enabling data packets with erroneous bits to be corrected by retransmitting the entire packet.

The Reed-Solomon error correction scheme is one possible error correction scheme which may be employed in the present invention. The invention is however not limited to the use of any particular error correction scheme. The Reed-Solomon error correction scheme is well known in the art and will therefore not be discussed in detail herein.

Generally, communication controller 203, or other arbitrating mechanism, selects data packets for transmission out of port 102 from either isochronous data stream 201 or bulk data stream 202. Any data waiting to be sent on the isochronous data stream 201 is preferably given priority over data on bulk data stream 202, thereby generally causing transmission data on bulk data stream 202 to wait until isochronous data stream 201 is fully serviced.

In a preferred embodiment, the isochronous data stream is employed for communication to external device 104. In order to ensure accuracy of data delivered to external device 104, error correction codes are preferably incorporated into data packets within isochronous data stream 201 as these packets leave port 102 for transmission along link 103 toward external device 104. Preferably, error correction code generator 204 inserts error correction data 205 into isochronous data stream 201 as the isochronous stream data packets leave port 102 of host computer 101 (FIG. 1).

Preferably, external device 104 possesses a mechanism for introducing error correction data 205 into data packets transmitted from external device 104 to host computer 101 which parallels the operation of error correction code generator 204, discussed above. Error correction code generator 204, and a similar mechanism in external device 104, may be implemented in hardware, firmware, software, or a combination of two or more of these three approaches within host computer 101 and external device 104.

Alternatively, error correction code generator 204 could be implemented in a separate computing device in communication with host computer 101, and all such alternatives are within the scope of the present invention. Performing error correction in the present invention may include implementing a protocol similar to established data transmission protocols having built-in data retransmission such as TCP, Kermit, and Zmodem, or "on-site" error correction such as that provided by the Reed-Solomon algorithm.

Figure 3:
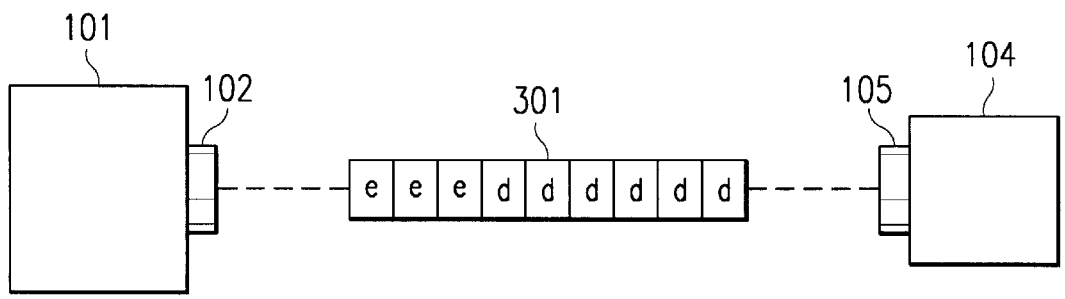
FIG. 3 depicts a data packet transmitted from a host computer to an external device according to a preferred embodiment of the present invention.

FIG. 3 depicts a data packet transmitted from host computer 101 to external device 104 according to a preferred embodiment of the present invention. Data packet 301 preferably includes both device data, for eventual use by the device 104 or host computer 101, and error correction data 205 for checking the accuracy of the device data, and optionally, correcting the device data. Preferably, data packets transmitted from external device 104 to host computer 101 also include both device data and error correction data for receipt and appropriate processing at host computer 101.

In a preferred embodiment, each data packet 301 comprises a pre-selected set of device data bits, illustrated in FIG. 3 by a sequence of lower case "d's", followed by a pre-selected number of error correction data bits, illustrated in FIG. 3 by a sequence of lower case "e's". The sequence of data and error correction bits in packet 301 is a preferred sequence for data packets being transmitted from host computer 101 to external device 104. For a data packet being transmitted from the external device 104 to the host computer 101, the data bits would preferably similarly lead the error correction bits. However, in the case of device 104 to host 101 communication, the data bits, illustrated by "d's" in FIG. 3, would preferably be illustrated as being to the left of the error correction bits, illustrated by "e's" in FIG. 3.

Alternatively, however, error correction data bits may be located anywhere within the data packets 301, and the relative number of device data bits and error correction data bits may vary depending upon the nature of the computer 101, the external device 104, and the application being executed, and all such variations are included within the scope of the invention.

In a preferred embodiment, the device data comes from isochronous data stream 201 (FIG. 2), and the error correction data is inserted into data packet 301 by error correction code generator 204 (FIG. 2) before the data packet leaves host computer 101. Preferably, an error correction scheme is put into effect wherein host computer 101 and external device 104 cooperate to ensure that erroneous data is detected and corrected. A preferred error correction scheme would enable device 104 to detect erroneous data arriving at port 105 of device 104 and employ the error correction data to both detect errors in the data and, preferably, to correct such errors in the transmitted data packet data right at the external device 104 or "on-site." In an alternative embodiment, upon detection of an error, the external device indicates the existence of an error condition and requests retransmission of the data packet having erroneous data.

In a preferred embodiment, data communication occurs bi-directionally between the host computer 101 and the external device 104. Similarly, the processes of inserting error correction data into data packets prior to transmission, attempting to correct erroneous data based on the error correction data, and/or requesting retransmission of data based on a determination of error in the transmitted data are preferably performed by both the host computer 101 as well as the external device 104.

Figure 4:
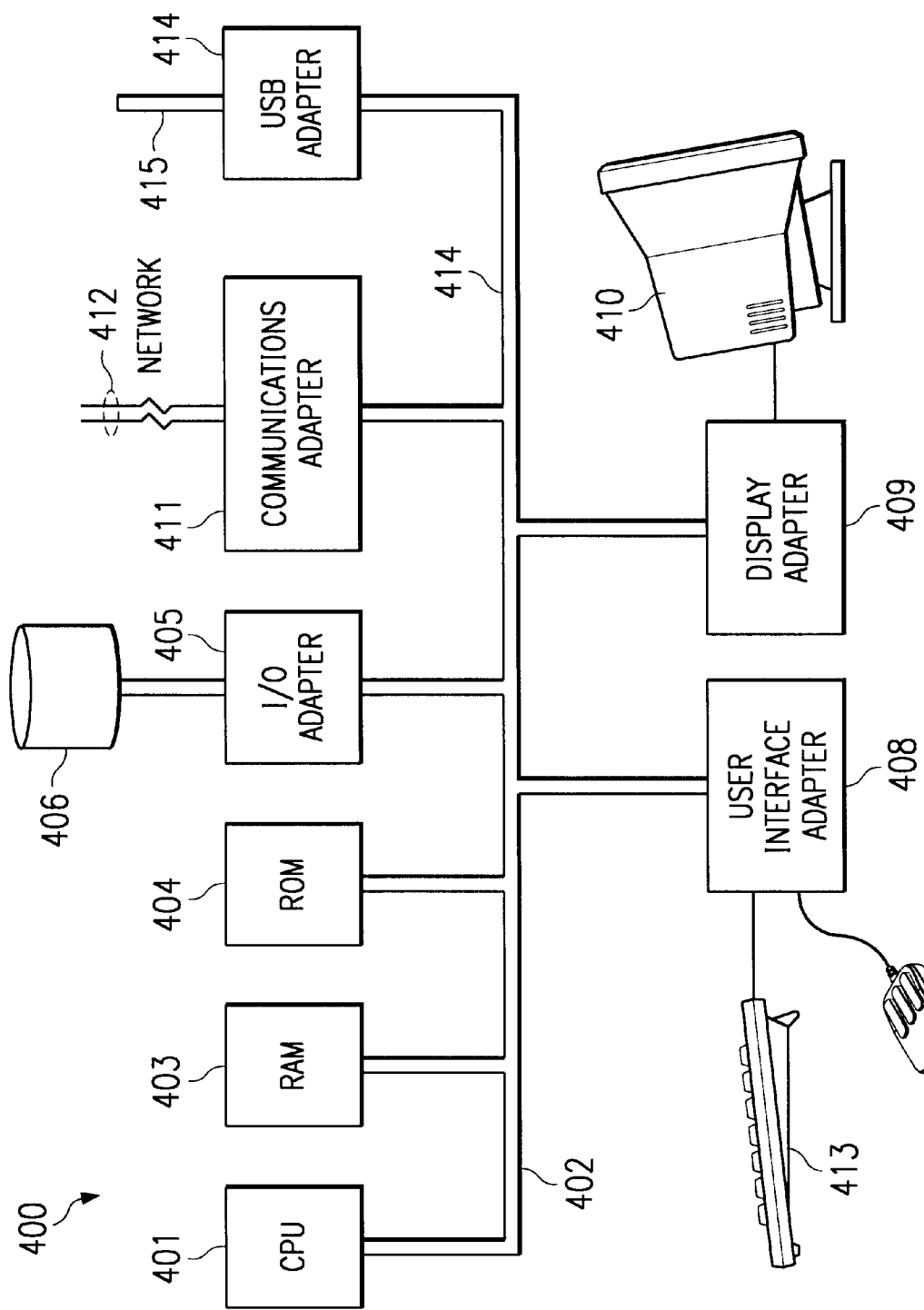
FIG. 4 illustrates computer system 400 adapted to use a preferred embodiment of the present invention.

FIG. 4 illustrates computer system 400 adapted to use the present invention. Central processing unit (CPU) 401 is coupled to system bus 402. The CPU 401 may be any general purpose CPU, such as an HP PA-8200. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art. System bus 402 is preferably also coupled to Universal Serial Bus 415 via Universal Serial Bus Adapter 414. One or more ports may be connected to Universal Serial Bus 415.

The USB adapter 414 may be a separate piece of hardware which plugs into the system bus. Alternatively, the USB adapter 414 may be integrated into chipsets on the computer motherboard.

The system bus 402 is also coupled to input/output (I/O) adapter 405, communications adapter card 411, user interface adapter 408, and display adapter 409. The I/O adapter 405 connects to storage devices 406, such as one or more of hard drive, CD drive, floppy disk drive, tape drive, to the computer system. Communications adapter 411 is adapted to couple the computer system 400 to a network 412, which may be one or more of local (LAN), wide-area (WAN), Ethernet or Internet network. User interface adapter 408 couples user input devices, such as keyboard 413 and pointing device 407, to the computer system 400. The display adapter 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for establishing continuous communication between a host computer and an external device, the method comprising the steps of:
    employing a high bandwidth communication interface on said host computer for communication between said host computer and said external device, wherein said interface has a high level of support on an operating system native to said host computer;
    employing a transfer mode ensuring guaranteed bandwidth for communication between said host computer and said external device;
    implementing a data reliability mechanism for ensuring accurate data communication between said host computer and said external device;
    determining, upon receipt of a data packet by said external device, whether erroneous data is present in said data packet; and
    wherein erroneous data is present in a said data packet, requesting a retransmission of said data packet.

2. The method of claim 1, comprising the further step of:
    wherein erroneous data is present in said data packet, correcting said erroneous data at said external device.

3. The method of claim 1, wherein the high bandwidth communication interface is a Universal Serial Bus.

4. The method of claim 1, wherein the transfer mode is an Isochronous transfer mode.

5. The method of claim 1, wherein the data reliability mechanism is implemented in both the host computer and the external device.

6. The method of claim 1, wherein the data reliability mechanism comprises:
    on-site error correction according to a Reed-Solomon algorithm.

7. A system for establishing continuous communication between a host computer and an external device, the system comprising:
    a high bandwidth communication interface on said host computer, wherein said interface is well supported on a native operating system of said host computer;
    a data transfer mode used in conjunction with said communication interface having a high pre-allocated communication bandwidth;
    a data reliability mechanism deployed between said host computer and said external device for ensuring data communication accuracy between said host computer and said external device, wherein the data reliability mechanism comprises a mechanism for data retransmission in case of an error.

8. The system of claim 7, wherein operation of said external device is latency-intolerant.

9. The system of claim 8, wherein said operation of said external device is a CD-RW write operation.

10. The system of claim 7, wherein the high bandwidth communication interface is a Universal Serial Bus.

11. The system of claim 7, wherein the data transfer mode is an isochronous transfer mode.

12. The system of claim 11, wherein the external device is a CD device and the system employs said isochronous transfer mode to continuously transmit data to said CD device during a CD burn operation.

13. A computer program product having a computer readable medium having computer program logic recorded thereon for establishing reliable communication between a host computer and an external device, the computer program product comprising:
    code for coordinating a data transmission from a Universal Serial Bus on said host computer to said external device;
    code for employing an isochronous transfer mode in conjunction with said data transmission to ensure a high level of pre-allocated bandwidth to said data transmission; and
    code for implementing a data reliability mechanism that comprises a data retransmission scheme to ensure accuracy of data in said data transmission from said host computer to said external device.

14. The computer program product of claim 13, wherein the code for implementing said data reliability mechanism is implemented both in said host computer and in said external device.

15. The computer program product of claim 13, wherein the external device is a CD-RW device.

16. The computer program product of claim 13, wherein the data reliability mechanism further comprises:
    a Reed-Solomon error correction scheme.

* * * * *